DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JULY 25, 1972

900 O.G. 1233

T900,027
PRODUCTION OF UREA-AMMONIUM SULFATE

Horace C. Mann, Jr., 1942 Holiday Drive,
Florence, Ala. 35630

Filed June 21, 1971, Ser. No. 155,133
Int. Cl. C05c *9/00*
U.S. Cl. 71—28
3 Sheets Drawing. 19 Pages Specification

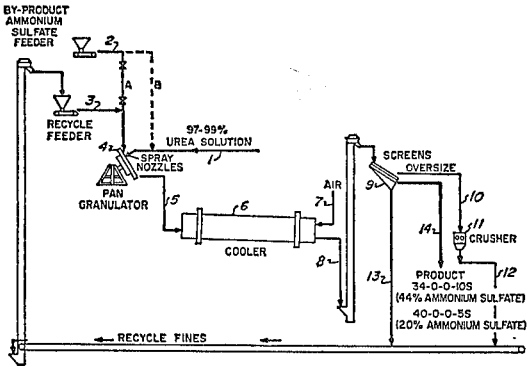

Figure 1:
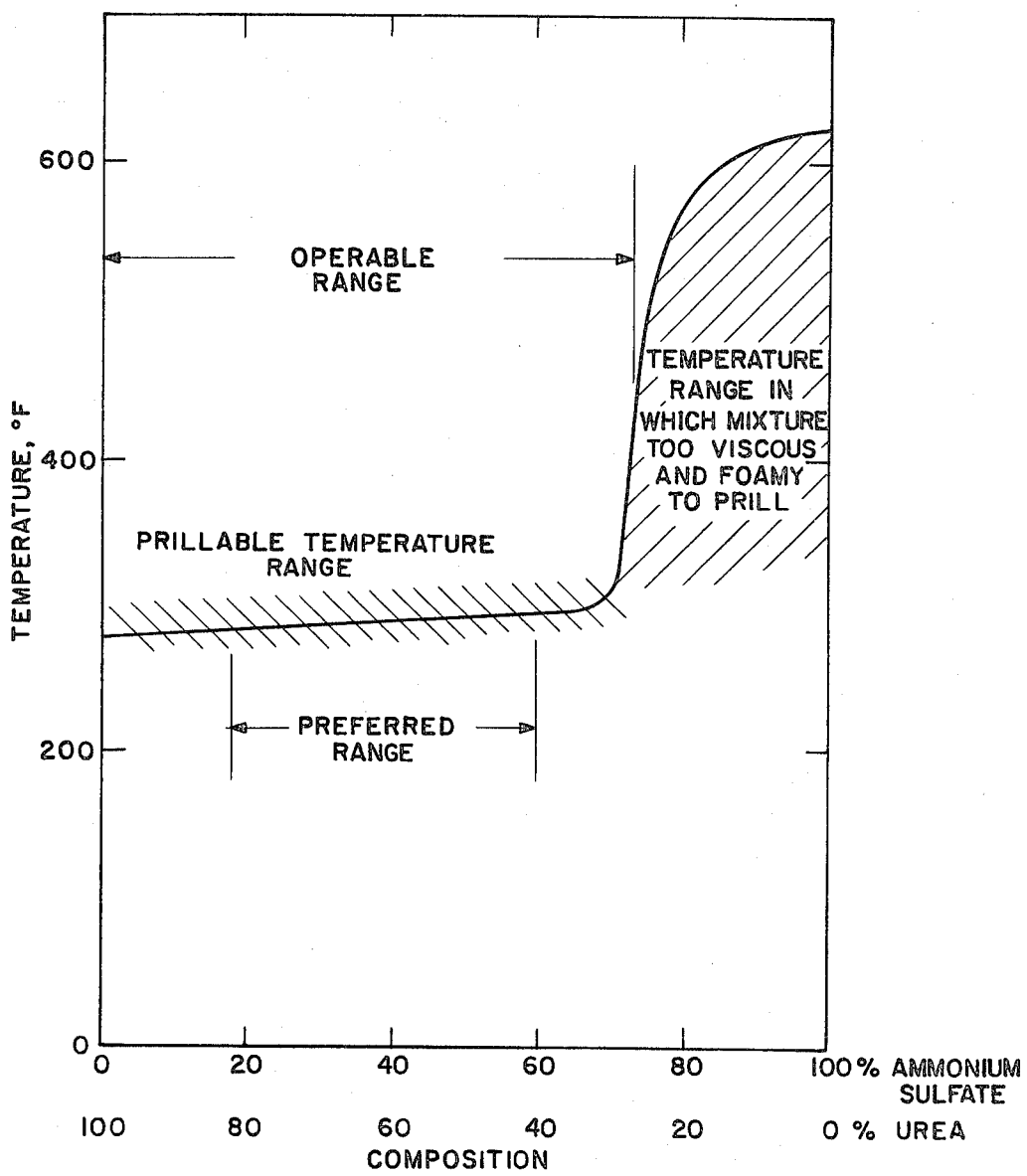
Figure 2:
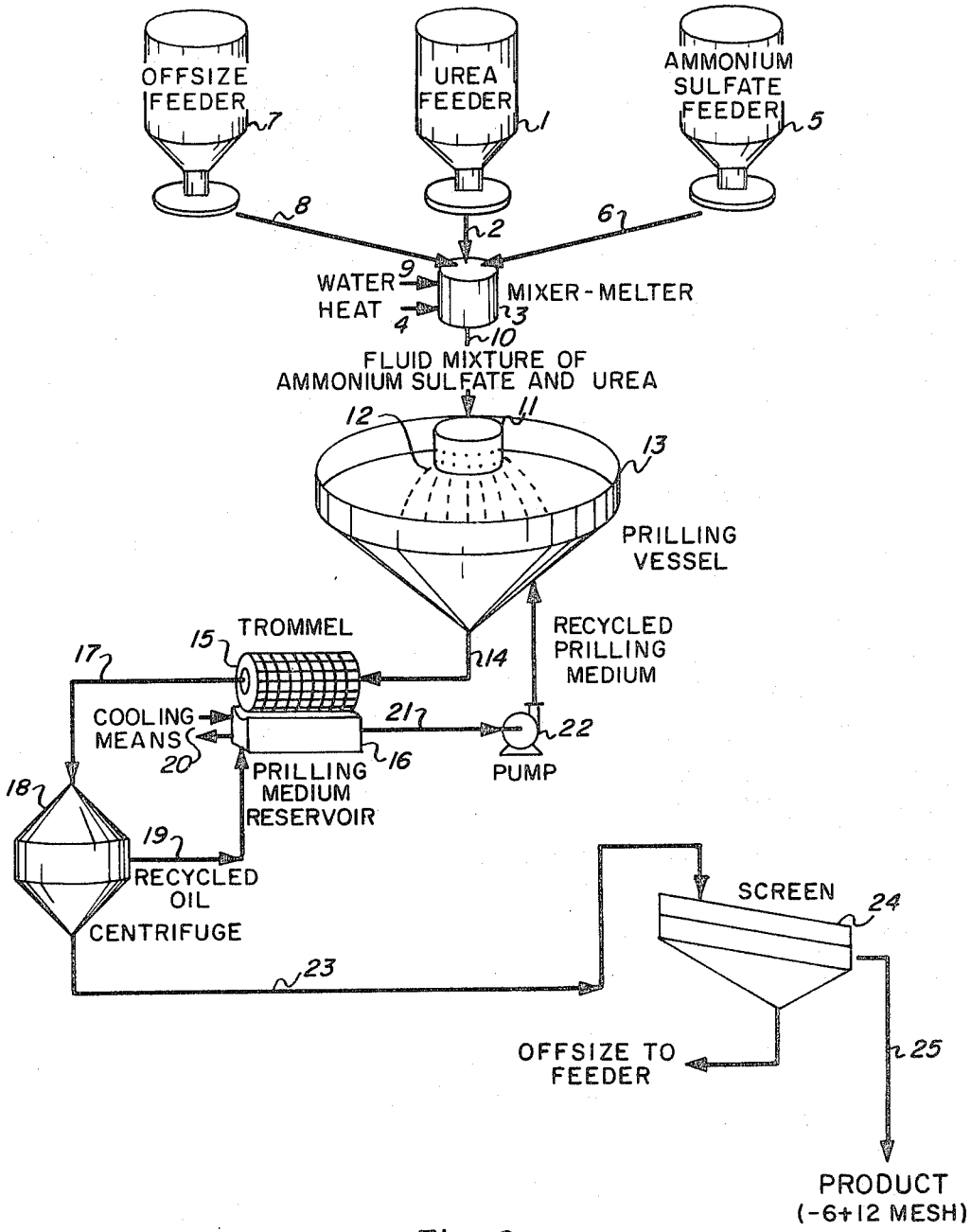
Figure 3:
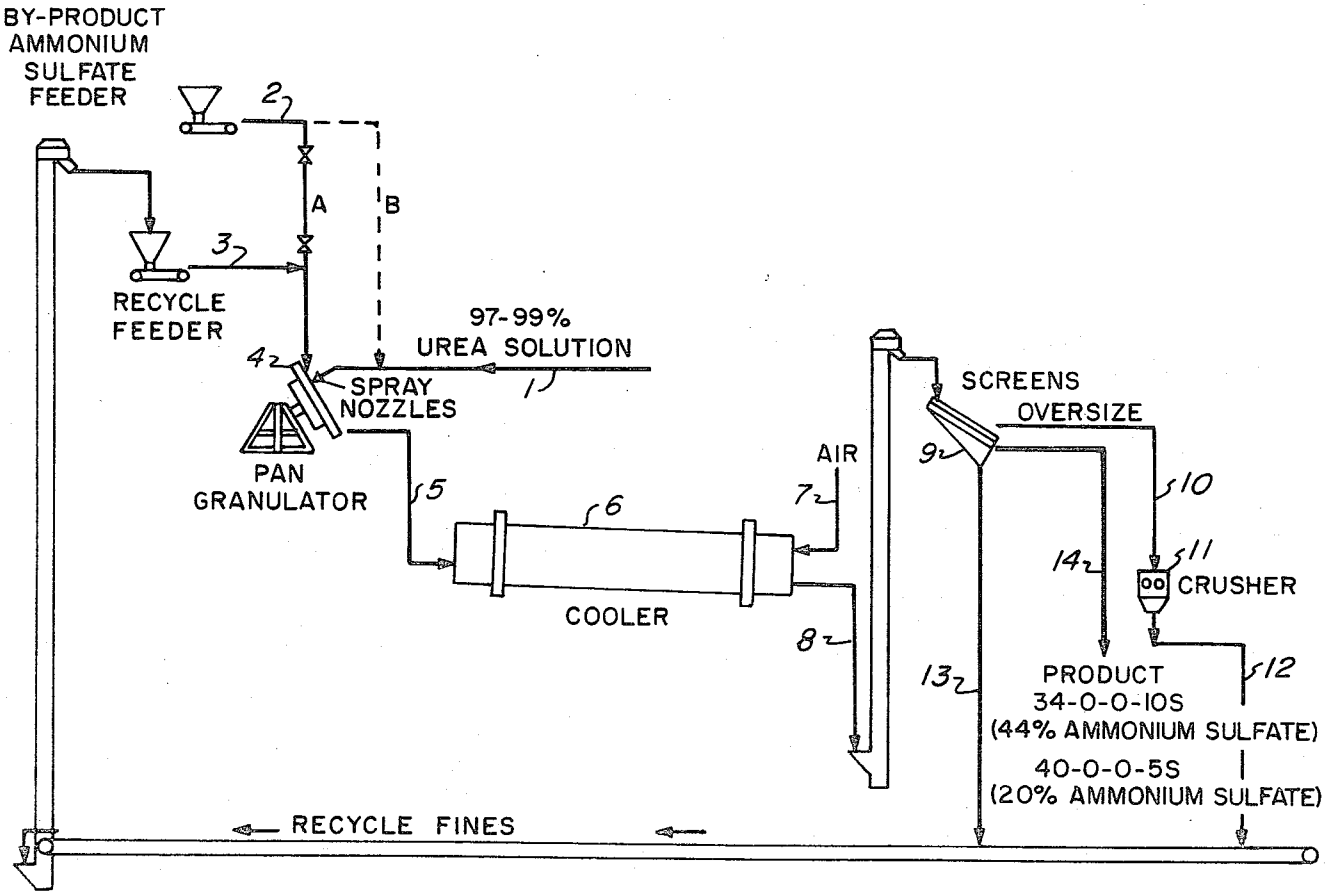

Fig. 3
FLOW DIAGRAM OF GRANULATION PILOT PLANT FOR PRODUCTION OF UREA-AMMONIUM SULFATE

A process for the production of urea-ammonium sulfate granules from urea and ammonium sulfate by several granulation methods. The proportion of ammonium sulfate in the mixture was varied from 15 to 70 percent by weight resulting in products containing from 42 to 29 percent N and 3 to 17 percent S, respectively. Unexpectedly, the urea-ammonium sulfate mixture in these proportions were fluid enough at 250° to 325° F. to be prilled and granulated by conventional means. Typical grades made in continuous-type pilot-plant work were 40–0–0–4S, 34–0–0–9S, and 30–0–0–13S. Most granulation was carried out by oil prilling or in a pugmill but any type of granulation method, such as air prilling or in drum or flaker, likely would be feasible. With use of 99.5 percent urea solution and solid ammonium sulfate, no drying step would be required. The presence of the ammonium sulfate increased the strength of the granules significantly.

No caking occurred when unconditioned 30–0–0–9S prills were stored in bulk for 6 months. Unconditioned product of 40–0–0–4S grade caked in 3 months but storage for this period was satisfactory when 2 percent by weight of kaolin clay conditioner was used. The critical relative humidity of these products was in the range 55 to 60 percent at 86° F.

PRODUCTION OF UREA-AMMONIUM SULFATE

Filed June 21, 1971 3 Sheets-Sheet 1

PRILLING RANGES OF UREA-AMMONIUM SULFATE MIXTURES

Horace C. Mann, Jr. INVENTOR.

BY Robert A. Petrusch

PRODUCTION OF UREA-AMMONIUM SULFATE

Filed June 21, 1971 3 Sheets-Sheet 2

PRILLING UREA-AMMONIUM SULFATE IN LIQUID MEDIUM

Horace C. Mann, Jr. INVENTOR.

BY Robert E. Strunk

PRODUCTION OF UREA-AMMONIUM SULFATE

Filed June 21, 1971 3 Sheets-Sheet 3

FLOW DIAGRAM OF GRANULATION PILOT PLANT FOR PRODUCTION OF UREA-AMMONIUM SULFATE

Horace C. Mann, Jr. INVENTOR.

BY Robert A. Petrusch Agt